United States Patent
Sekiguchi et al.

(10) Patent No.: US 9,782,920 B2
(45) Date of Patent: Oct. 10, 2017

(54) NOZZLE FOR INJECTION MOLDING MACHINE

(71) Applicant: FANUC Corporation, Yamanashi (JP)

(72) Inventors: Shoutarou Sekiguchi, Yamanashi (JP); Hiroyasu Asaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 73 days.

(21) Appl. No.: 15/006,452

(22) Filed: Jan. 26, 2016

(65) Prior Publication Data

US 2016/0214295 A1    Jul. 28, 2016

(30) Foreign Application Priority Data

Jan. 27, 2015 (JP) .................. 2015-013613

(51) Int. Cl.
*B29C 45/63* (2006.01)
*B29C 45/20* (2006.01)

(52) U.S. Cl.
CPC .............. *B29C 45/20* (2013.01); *B29C 45/63* (2013.01)

(58) Field of Classification Search
CPC .................................. B29C 45/20; B29C 45/63
See application file for complete search history.

(56) References Cited

U.S. PATENT DOCUMENTS

| 3,295,169 A | * | 1/1967 | Moslo | .................. B29C 45/231 |
| | | | | 222/504 |
| 3,606,171 A | * | 9/1971 | Voelker | .................. B29C 45/20 |
| | | | | 239/587.1 |
| 2011/0027411 A1 | | 2/2011 | Puest et al. | |

FOREIGN PATENT DOCUMENTS

| JP | H05-7423 U | 2/1993 |
| JP | 3014793 U | 8/1995 |
| JP | 9-117936 A | 5/1997 |
| JP | 11-170320 A | 6/1999 |
| JP | 2011-62864 A | 3/2011 |
| JP | 2013-151131 A | 8/2013 |

OTHER PUBLICATIONS

Office Action in JP Application No. 2015-013613, mailed Apr. 26, 2016.

* cited by examiner

*Primary Examiner* — Jill Heitbrink
(74) *Attorney, Agent, or Firm* — Hauptman Ham, LLP

(57) ABSTRACT

A resin injection nozzle is provided with a first mating surface on an inner-diameter side and a second mating surface on an outer-diameter side relative to the first mating surface, and a through-hole is provided extending from a void defined between the first and second mating surfaces toward the distal end of the resin injection nozzle. Thus, gas generated from a molten resin can be effectively discharged.

2 Claims, 6 Drawing Sheets

NOZZLE FOR INJECTION MOLDING MACHINE

RELATED APPLICATIONS

The present application claims priority to Japanese Application Number 2015-013613, filed Jan. 27, 2015, the disclosure of which is hereby incorporated by reference herein in its entirety.

BACKGROUND OF THE INVENTION

Field of the Invention

The present invention relates to a nozzle for an injection molding machine.

Description of the Related Art

An injection molding machine generally comprises a mold clamping mechanism section and an injection mechanism section that are disposed on a machine base. The injection mechanism section serves to heat and melt a resin material (pellets) and inject the resulting molten resin into a cavity of a mold. The mold clamping mechanism section mainly serves to open and close the mold.

In the mold clamping mechanism section, a fixed platen, a movable platen, and a rear platen disposed behind the movable platen are connected by a plurality of tie rods. The movable platen and the rear platen move along the tie rods. A mold is attached to each of opposite working surfaces of the fixed and movable platens and mold clamping and opening operations are performed.

In the injection mechanism section, an injection unit is advanced and retracted relative to the fixed platen, a nozzle on the distal end of an injection cylinder of the injection unit is brought into close contact with a resin injection port of the fixed platen, and the resin is supplied through the injection cylinder. The injection mechanism section is provided with a nozzle touch mechanism for bringing the nozzle on the cylinder end into close contact with or separating it from the resin injection port of the fixed platen. The nozzle on the distal end of the injection cylinder is configured to be pressed against the resin injection port of the fixed platen by the nozzle touch mechanism during continuous molding operation.

FIG. 6 is a view showing a part configuration around the nozzle of the injection mechanism section. A nozzle 2 is disposed in front of a cylinder 1, and the cylinder 1 and the nozzle 2 are secured to each other by bolts 3. The cylinder 1 and the nozzle 2 are located face to face with each other. Numeral 7 denotes mating surfaces of these two members. A molten resin supplied from a hopper (not shown) is fed to the resin injection port of the fixed platen through a molten resin passage 6. Heaters 4 and 5 are wound on the outer-diameter portions of the cylinder 1 and the nozzle 2, respectively. The temperatures of the cylinder 1 and the nozzle 2 are controlled by energizing the heaters 4 and 5.

Gas may be generated from the molten resin in the molten resin passage 6 in some cases. If the generated gas gets into a mold, it may affect a molded article and possibly cause poor appearance or reduced strength of the molded article. Preferably, therefore, the gas should be prevented from getting into the mold. To attain this, the cylinder 1 or the nozzle 2 is provided with an exhaust port through which the gas can be removed. As shown in FIG. 6, a small gap or exhaust groove 8 is formed between mating surfaces of the cylinder 1 and the nozzle 2.

A CD-ROM of Japanese Utility Model Application No. 3-53856 (Japanese Utility Model Application Laid-Open No. 5-7423) discloses a technique in which a nozzle for an injection molding machine is divided into a proximal portion and a distal end portion, and a resin passage in a nozzle body is formed with a gas vent passage that prevents leakage of resin but allows passage of gas.

Japanese Registered Utility Model Publication No. 3014793 discloses a technique in which a nozzle of an injection molding machine is provided with radial degassing grooves on contact surfaces of the nozzle and a heating cylinder. The degassing grooves communicate with an annular vacant space defined by an annular step portion on the outer periphery of the nozzle. Further, the heating cylinder is provided with a communication hole through which the annular vacant space opens to the atmosphere such that gas can be discharged in the radial direction of the cylinder.

Japanese Patent Application Laid-Open No. 11-170320 discloses a technique in which an injection unit of an injection molding machine is provided with a ring-shaped, porous gas discharge member through which gas generated in the injection unit can be discharged to the outside.

In the technique shown in FIG. 6, the heater 4 is located on the outer-diameter portion of the cylinder 1 so as to cover the greater part of it. Therefore, the location of the exhaust groove 8 is inevitably limited to an area where the heater 4 is not located, possibly affecting the cylinder temperature control by the heater 4. If the heater 4 is located so as to cover the exhaust groove 8, in contrast, gas cannot be discharged smoothly through the exhaust groove 8 and may stagnate in the cylinder 1, thereby corroding the heater 4 and its surrounding members in some cases.

In the technique disclosed in the CD-ROM of Japanese Utility Model Application No. 3-53856 (Japanese Utility Model Application Laid-Open No. 5-7423), the gas vent passage is formed in the nozzle that is divided into the proximal portion and the distal end portion. Thus, the nozzle must be divided into the proximal portion and the distal end portion in order to form the gas vent passage, so that it may be more complicated in structure and higher in cost than a one-piece nozzle.

In the technique disclosed in Japanese Registered Utility Model Publication No. 3014793, as in the technique shown in FIG. 6, the gas is discharged in the radial direction of the cylinder. Possibly, therefore, the location of the gas vent passage is limited to an area where no heater is wound on the cylinder, or the gas may stagnate in a gas vent passage, if the gas vent passage is closed by a heater.

In the technique disclosed in Japanese Patent Application Laid-Open No. 11-170320, a nozzle must be formed using a porous component, which is a dedicated member for gas venting.

SUMMARY OF THE INVENTION

Accordingly, the object of the present invention is to provide a nozzle for an injection molding machine, capable of effectively discharging gas generated from a molten resin therein.

A resin injection nozzle according to the present invention can be installed on the distal end of a heating cylinder of an injection molding machine so as to be located face to face with the heating cylinder on a mating surface. The mating surface comprises a first mating surface on an inner-diameter side and a second mating surface on an outer-diameter side relative to the first mating surface. At least one through-hole is provided extending from a void defined between the first and second mating surfaces toward the distal end of the resin injection nozzle.

Thus, gas generated from a molten resin can permeate through the first mating surface and be delivered toward the distal end of the nozzle through the void and the through-hole and discharged to the outside. A heater may be disposed radially outside the nozzle and hinder exhaust. Since there are few obstacles to the exhaust in the direction toward the distal end side of the nozzle, however, the gas generated from the molten resin can be effectively discharged.

The resin injection nozzle may comprise a fixing member for securing the nozzle to the heating cylinder, and the fixing member secures the nozzle to the heating cylinder through the through-hole.

Thus, a hole that penetrates the fixing member for securing the heating cylinder and the resin injection nozzle can serve also as the through-hole through which the gas generated from the molten resin is discharged, so that separate holes need not be provided.

The resin injection nozzle may comprise a device configured to suck in or supply air through the through-hole.

Thus, the gas generated from the molten resin can be discharged more efficiently than when the gas is naturally discharged through the through-hole.

According to the present invention, gas generated from a molten resin in a resin injection nozzle for an injection molding machine can be effectively discharged.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

First Embodiment

Figure 1A:
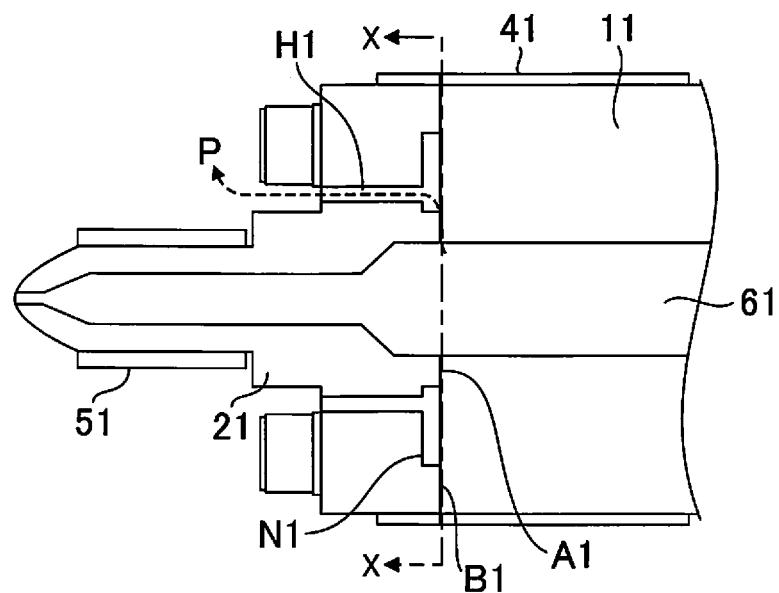
FIG. 1A is a side view of a part configuration around a nozzle according to a first embodiment of the present invention.
Figure 1B:
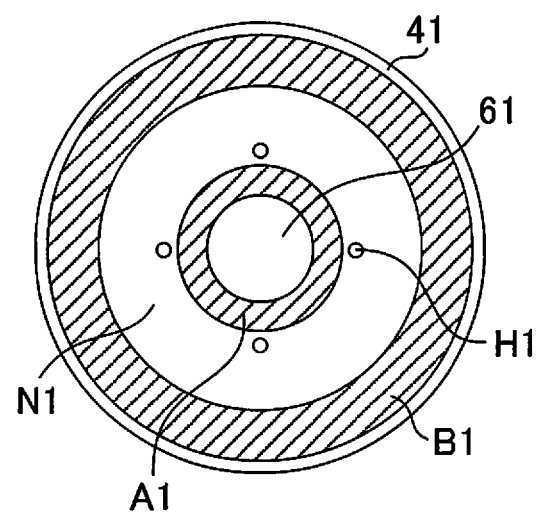
FIG. 1B is a view of an X-X cross-section of FIG. 1A taken from the side of a cylinder.

An embodiment of the present invention will now be described with reference to the accompanying drawings. FIG. 1A is a side view of a part configuration around a nozzle according to the present embodiment. FIG. 1B is a view of an X-X cross-section of FIG. 1A taken from the side of a cylinder. A nozzle 21 is disposed in front of a cylinder 11 and serves to feed a molten resin, which is supplied from a hopper (not shown) through a molten resin passage 61, to a resin injection port of a fixed platen. Heaters 41 and 51 are wound on the outer-diameter portions of the cylinder 11 and the nozzle 21, respectively. The temperatures of the cylinder 11 and the nozzle 21 are controlled by energizing the heaters 41 and 51.

Figure 6:
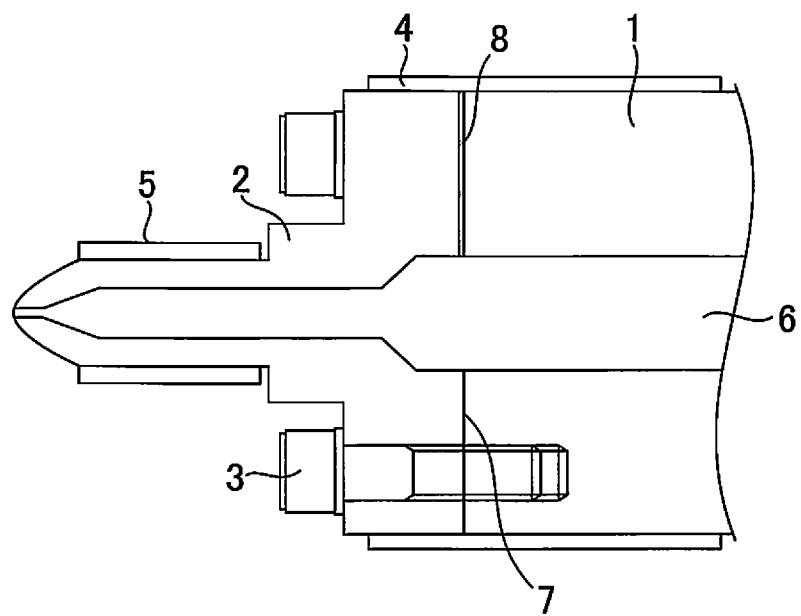
FIG. 6 is a view showing a part configuration around a prior art nozzle.

The cylinder 11 and the nozzle 21 are secured to each other by bolts (not shown). The cylinder 11 and the nozzle 21 are located face to face with each other. The structure of mating surfaces of the cylinder 11 and the nozzle 21 is different from that of the prior art technique shown in FIG. 6. In the present embodiment, each of the mating surfaces of the cylinder 11 and the nozzle 21 is formed of a first mating surface A1 adjacent to the molten resin passage 61 and an annular second mating surface B1 separated radially outward from the first mating surface A1. The cylinder 11 and the nozzle 21 are located so that their mating surfaces face each other. Further, a void N1 is defined between the first and second mating surfaces A1 and B1. In the vicinity of the first mating surface A1, exhaust passages H1 that lead to the distal end of the nozzle 21 are formed so as to communicate with the void N1.

The cylinder 11 and the nozzle 21 are in close contact with each other on the first mating surface A1. The area and contact pressure of the first mating surface A1 are adjusted so that a small gap is formed between the cylinder 11 and the nozzle 21 if the resin pressure in the molten resin passage 61 exceeds a predetermined value. This small gap does not allow passage of the molten resin and is just large enough to allow permeation of only gas generated in the molten resin passage 61. In the prior art technique shown in FIG. 6, the distance from the molten resin passage 6 to the outer peripheral surface of the cylinder 1 is long. It is difficult, therefore, to form a small gap that allows permeation of only gas generated in the molten resin passage 6 if the resin pressure in the molten resin passage 6 exceeds a predetermined value with the mating surfaces normally in close contact with each other as in the present embodiment shown in FIG. 1. In the present embodiment, each mating surface is divided in two, so that the distance from the molten resin passage 61 to each exhaust passage H1 that opens to the outside can be reduced. Thus, the first mating surface A1 can be constructed so as to form the small gap that does not allow passage of the molten resin and allows permeation of only the gas generated in the molten resin passage 61 if the resin pressure in the molten resin passage 61 exceeds the predetermined value.

On the other hand, the cylinder 11 and the nozzle 21 are in closer contact with each other on the second mating surface B1. Since the void N1 communicates with the exhaust passages H1, moreover, the pressure therein cannot be very high. Therefore, gas generated from the molten resin is discharged from the distal end side of the nozzle through the void N1 and the exhaust passages H1 (discharge flow paths P), without being discharged to the outside through the second mating surface B1, after having permeated through the first mating surface A1. The first mating surface A1 is not restricted to the structure of the present invention, and it may alternatively be configured to previously form a gap small enough to prevent leakage of the molten resin or be formed with a groove or irregularities through which the gas can be discharged.

Second Embodiment

Figure 2:
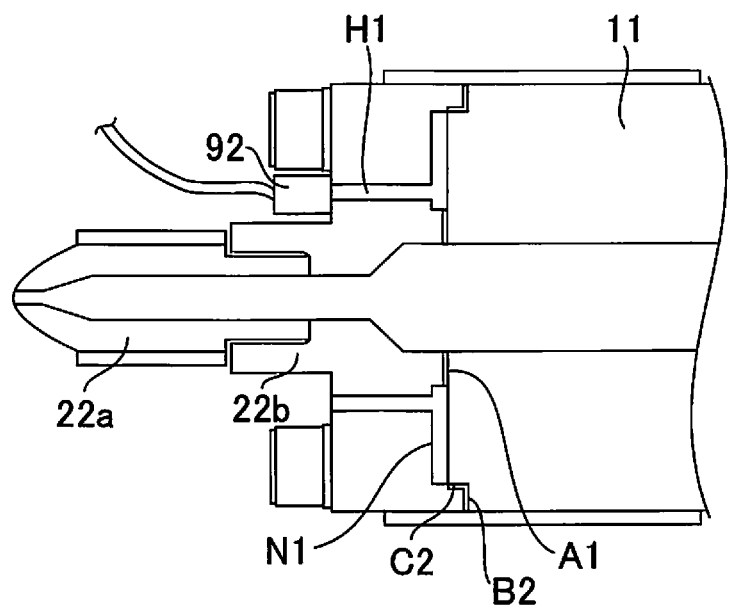
FIG. 2 is a view showing a part configuration around a nozzle according to a second embodiment of the invention.

FIG. 2 is a side view of a part configuration around a nozzle according to another embodiment. The present invention differs from the foregoing embodiment in that the nozzle has a two-piece structure comprising a first nozzle 22a and a second nozzle 22b, a second mating surface B2 is stepped, and a suction device 92 is additionally provided.

As shown in FIG. 2, the nozzle is not restricted to a one-piece structure and may be based on the two-piece structure comprising the first and second nozzles 22a and 22b. Further, the second mating surface B2 can be formed having a difference in level from a first mating surface A1 so that the two surfaces are not flush with each other. If this is done, a cylinder 11 and the nozzle 22b can contact with each other on that part of a side surface portion C2 where the second mating surface B2 is formed, as well as on the second mating surface B2. Thus, the cylinder 11 and the second nozzle 22b can be positioned relative to each other as they contact on the second mating surface B2.

In the present embodiment, the suction device 92 is provided on that part of an exhaust passage H1 which opens to the outside and serves to suck in gas generated in a molten resin passage 61 and discharged to a void N1 and the exhaust passage H1. Thus, the gas discharged to the exhaust passage H1 can be exhausted more efficiently than in the case where the gas is naturally discharged to the outside. Further, a supply device may be provided in place of the suction device 92. In this case, air is externally supplied to the exhaust passage H1, and the supplied air and the gas in the exhaust passage H1 are exhausted to the outside through other exhaust passages H1.

The first embodiment and the present embodiment are different in three points; the structure of the nozzle, the structure of the second mating surface, and the presence/absence of the suction device. Alternatively, however, these two embodiments may be made different in only one or two of these points.

Third Embodiment

Figure 3A:
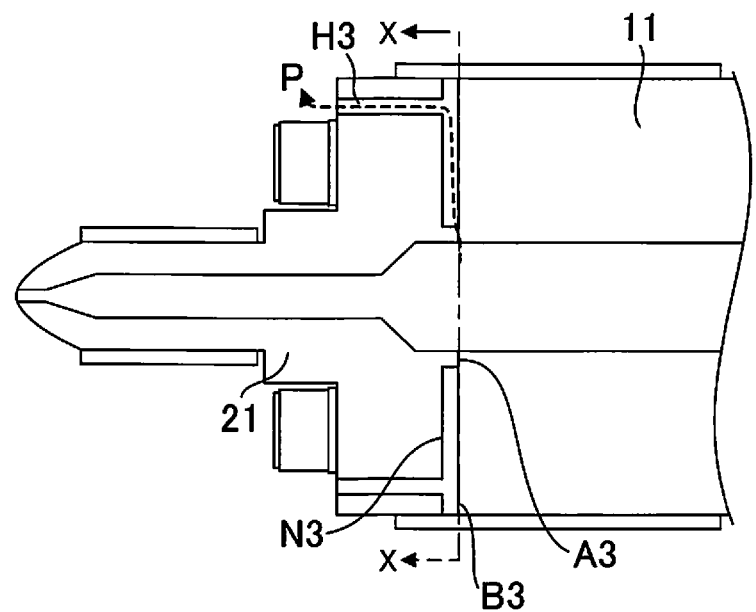
FIG. 3A is a side view of a part configuration around a nozzle according to a third embodiment of the invention.
Figure 3B:
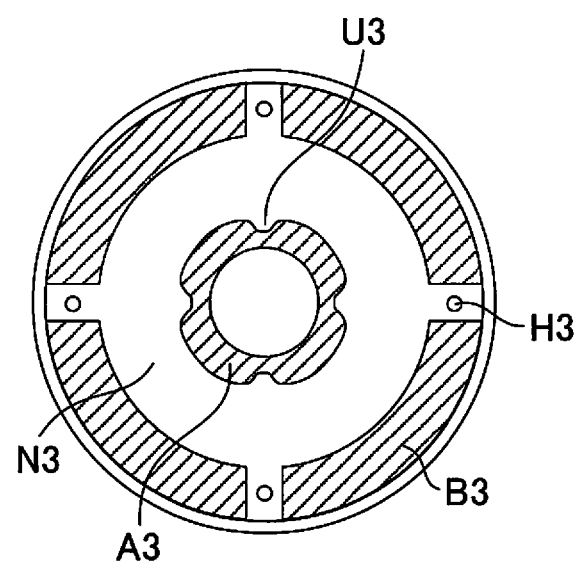
FIG. 3B is a view of an X-X cross-section of FIG. 3A taken from the side of a cylinder.

FIG. 3A is a side view of a part configuration around a nozzle according to still another embodiment. FIG. 3B is a view of an X-X cross-section of FIG. 3A taken from the side of a cylinder.

In the present embodiment, as shown in FIG. 3B, radially recessed portions U3 are arranged at peripheral portions of a first mating surface A3. The recessed portions U3 serve to reduce the distance between a molten resin passage 61 and a void N3 at their locations. Therefore, gas generated from a molten resin can easily permeate through areas corresponding to the recessed portions U3. In the present embodiment, moreover, four second mating surfaces B3 are arranged in a circumferentially divided manner, and exhaust passages H3 are individually provided between the exhaust passages H3. In this configuration, a nozzle 21 can be more stably held by being abutted against a cylinder 11 on the second mating surfaces B3.

Fourth Embodiment

Figure 4A:
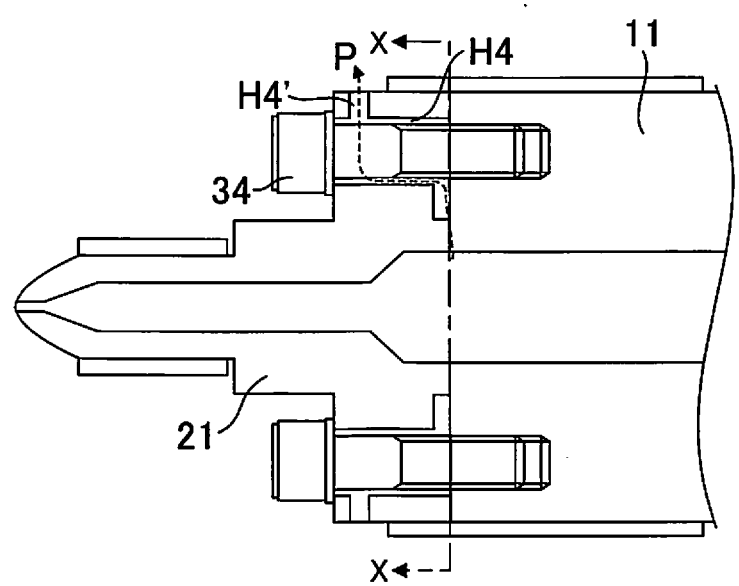
FIG. 4A is a side view of a part configuration around a nozzle according to a fourth embodiment of the invention.
Figure 4B:
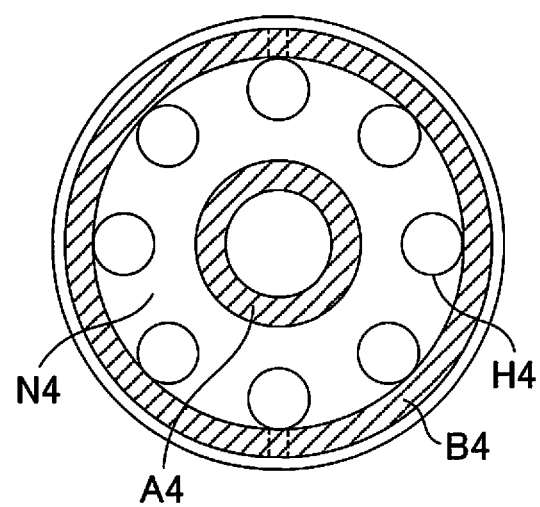
FIG. 4B is a view of an X-X cross-section of FIG. 4A taken from the side of a cylinder.

FIG. 4A is a side view of a part configuration around a nozzle according to a further embodiment. FIG. 4B is a view of an X-X cross-section of FIG. 4A taken from the side of a cylinder.

In the present embodiment, numeral 34 denotes bolts, which secure a cylinder 11 and a nozzle 21 to each other. The present embodiment differs from the foregoing embodiments in that exhaust passages H4 serve also as through-holes in the nozzle 21 into which the bolts 34 are inserted when the cylinder 11 and the nozzle 21 are secured to each other. As shown in FIG. 4B, the through-holes or exhaust passages H4 for eight bolts 34 are circumferentially arranged near a second mating surface B4. Gas generated from a molten resin is discharged to the outside through the exhaust passages H4. Although the bolts 34 are each formed with a thread, the through-holes or exhaust passages H4 into which the bolts 34 are inserted are not. Even when the bolts 34 are inserted and tightened, therefore, a slight gap is formed between the outer peripheral surface of each of the bolts 34 and the inner peripheral surface of each corresponding through-hole (exhaust passage H1), and gas is discharged to the outside through the gap.

Further, an exhaust hole H4' is provided on that side of each through-hole (exhaust passage H4), extending in the radial direction of the nozzle 21 from each exhaust passage H4. The exhaust hole H4' enables the gas in the through-hole (exhaust passage H4) to be effectively discharged to the outside if the head of each bolt 34 is so big that it blocks the exhaust passage H4, for example.

Fifth Embodiment

Figure 5A:
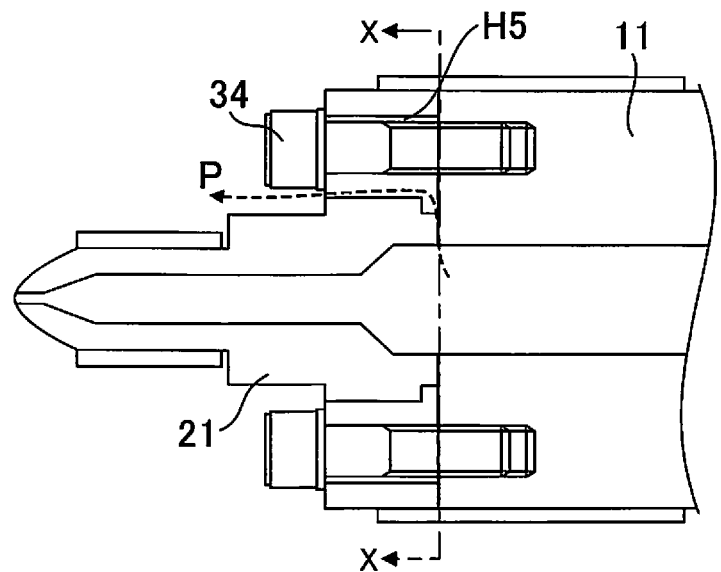
FIG. 5A is a side view of a part configuration around a nozzle according to a fifth embodiment of the invention.
Figure 5B:
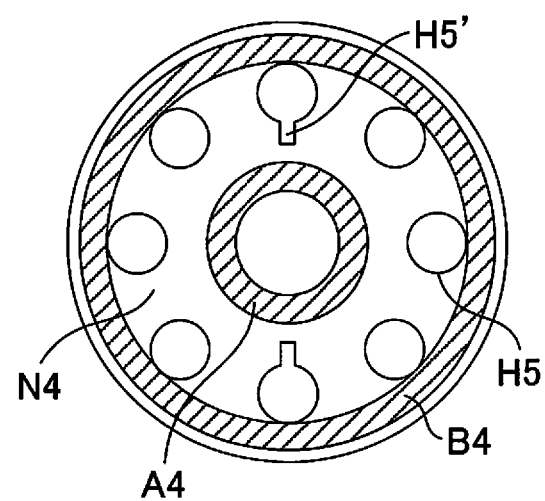
FIG. 5B is a view of an X-X cross-section of FIG. 5A taken from the side of a cylinder.

FIG. 5A is a side view of a part configuration around a nozzle according to an additional embodiment. FIG. 5B is a view of an X-X cross-section of FIG. 5A taken from the side of a cylinder.

In the present embodiment, numeral 34 denotes bolts, which secure a cylinder 11 and a nozzle 21 to each other. The present embodiment differs from the fourth embodiment in that a groove H5' is provided in each of two of through-holes in the nozzle 21 into which the bolts 34 are inserted when the cylinder 11 and the nozzle 21 are secured to each other. As shown in FIG. 5B, the through-holes for eight bolts 34 are circumferentially arranged near a second mating surface B4. Each of the two of the eight through-holes is provided with the groove H5', and gas generated from a molten resin is discharged to the outside through the groove H5'. In the fourth embodiment, the through-holes or exhaust passages H4 into which the bolts 34 are inserted are not formed with any thread. In the present embodiment, however, the gas is discharged to the outside through the groove H5', so that more rigid fixation can be achieved by also forming threads on the through-hole side.

In the fourth embodiment, moreover, the exhaust hole H4' is provided on that side of each through-hole (exhaust passage H4) nearer to the bolts 34, extending in the radial direction of the nozzle 21 from each exhaust passage H4. In the present embodiment, however, the gas is discharged through the groove H5'. If the head of each bolt 34 is somewhat big, therefore, the gas can be effectively discharged to the outside without providing any exhaust hole.

The invention claimed is:

1. A resin injection nozzle capable of being installed on the distal end of a heating cylinder of an injection molding machine so as to be located face to face with the heating cylinder on a mating surface,
the mating surface comprising:
a first mating surface on an inner-diameter side; and
a second mating surface on an outer-diameter side relative to the first mating surface,
wherein at least one through-hole is provided extending from a void defined between the first and second mating surfaces toward the distal end of the resin injection nozzle, and the heating cylinder and the resin injection nozzle were fixed by a fixing member through the through-hole.

2. The resin injection nozzle according to claim 1, comprising a device configured to suck in or supply air through the through-hole.

\* \* \* \* \*